United States Patent [19]

Bennison et al.

[11] Patent Number: 5,411,583
[45] Date of Patent: May 2, 1995

[54] HF-RESISTANT CERAMICS AND USE THEREOF

[75] Inventors: Stephen J. Bennison, Princeton, N.J.; Kurt R. Mikeska, Wilmington, Del.

[73] Assignee: E. I. du Pont de Nemours and Company, Wilmington, Del.

[21] Appl. No.: 152,810

[22] Filed: Nov. 15, 1993

[51] Int. Cl.$^6$ .............................................. C04B 35/10
[52] U.S. Cl. .............................. 106/14.05; 106/287.17; 106/286.5; 106/286.8; 106/286.6; 501/119; 501/153; 501/127
[58] Field of Search ................. 501/127, 153, 119; 106/286.8, 287.17, 286.5, 286.2, 286.6, 14.05

[56] References Cited

U.S. PATENT DOCUMENTS

| | | | |
|---|---|---|---|
| 3,026,210 | 3/1962 | Coble | 501/127 |
| 3,484,376 | 12/1969 | Paris et al. | 501/127 |
| 4,442,676 | 4/1984 | Rudolph et al. | 60/671 |
| 4,762,655 | 8/1988 | Rhodes et al. | 264/65 |
| 4,766,260 | 8/1988 | Manzer et al. | 570/168 |
| 4,797,238 | 1/1989 | Rhodes et al. | 501/127 |
| 5,015,791 | 5/1991 | Rao | 570/168 |
| 5,051,537 | 9/1991 | Manzer | 570/168 |
| 5,136,113 | 8/1992 | Rao | 570/176 |

FOREIGN PATENT DOCUMENTS

| | | |
|---|---|---|
| 61-227838 | 10/1986 | Japan . |
| 63-197510 | 8/1988 | Japan . |
| 4-6152 | 1/1992 | Japan . |
| 4-31360 | 2/1992 | Japan . |

OTHER PUBLICATIONS

Roy et al, "Solubilities of Magnesia, Titania, and Magnesium Titanate in Aluminum Oxide", Jour Amer Soc, 51(1) pp. 1–6, 1968, No month.
Bennett, J. P., "Corrosion Resistance of Selected Ceramic materials to Sulfuric Acid", *Bureau of Mines Report of Investigations*, Report No. 9011, U.S. Dept. of the Interior, 1986. No month.
Avgustinik, A. I. et al., "Thermodynamic Analysis of the Interaction of Certain Oxides with Hydrofluoric Acid Solutions", *Russian Journal of Physical Chemistry*, 50(4), 1976. No month.
Coble, R. L., "Sintering Crystalline Solids. II. Experimental Test of Diffusion Models in Powder Compacts", *Journal of Applied Physics*, 32(5), 793–799, 1961. No month.
Haroun, N. A. et al., Chap. 12, "Effects of Additions of MgO, ZnO and NiO on Grain Growth in Dense Alumina", *Transactions of the British Ceramic Society*, 69, 73–79, 1970 No month.
Genthe, W. et al., "Influence of Chemical Composition on Corrosion of Alumina in Acids and Caustic Solutions", *J. Eur. Ceramic Socity*, 9, 417–425, 1992 No month.
Bennison, et al, "A History of the Role of MgO in the Sintering of $\alpha$–Al$_2$O$_3$", *Ceramic Transactions*, 7, 13–49, 1990 No month.
Roy, S. K. et al., "Solubilities of Magnesia, Titania, and Magnesium Titanate in Aluminum Oxide", *Journal of the American Ceramic Society*, 5(1), 1–6, 1968 No month.
Cohen, A. et al, "Effect of MgO Dopant Dispersing Method on Density and Microstructure of Alumina Ceramics", *Advanceds in Ceramics: Structure and Properties of MgO and Al$_2$O$_3$ Ceramics*10, 780–790, 1984 no month.

*Primary Examiner*—Mark L. Bell
*Assistant Examiner*—C. M. Bonner

[57] ABSTRACT

Hydrogen fluoride-resistant articles are disclosed which have HF contact surfaces consisting essentially of sintered, single phase, polycrystalline, solid solution alumina and magnesia ceramic. The ceramic has a magnesia content equal to or less than the solubility limit of magnesia in alumina at the sintering temperature for the ceramic. Also disclosed are processes using such surfaces as HF contact surfaces.

13 Claims, No Drawings

HF-RESISTANT CERAMICS AND USE THEREOF

FIELD OF THE INVENTION

This invention relates to the use of ceramics as functional materials in highly-corrosive environments, and more particularly to the use of alumina-based ceramic compositions as surface materials for environments containing hydrogen fluoride.

BACKGROUND

Alumina, has many desirable intrinsic physical properties including mechanical strength, temperature resistance, and electrical resistance, which are primarily determined by the crystal structure. Most processes used to obtain functional ceramic materials, such as alumina, consist of sintering (at a sufficiently high temperature) compressed particulate-porous compacts of fine, crystalline grains of appropriate starting materials to form strong polycrystalline products. During sintering, the particulate-porous compact undergoes changes in its structure which are common to porous fine-grained crystalline materials. There is an increase in grain size, there is a change in pore shape, and there is change in pore size and number. Sintering usually produces a decrease in porosity and results in densification of the particulate compact. The sintering process can be adjusted to control final grain size and density.

Reactions and thermal transformations that take place during sintering result in structures composed of an assembly of crystalline grains having irregular shapes and different orientations (polycrystalline). Depending on the starting materials and thermal treatment, more than one phase can develop during sintering. Polycrystalline structures with more than one phase are commonly called multiphase materials. The final properties of a polycrystalline structure are dependent on the interfaces or grain boundaries, and the presence or absence of multiphase material.

Additives may be used in the sintering of ceramic alumina compositions for several purposes. These purposes may include: grain growth repression or acceleration, reduction in sintering temperature, alteration in porosity and removal of impurities. In the preparation of alumina, if MgO is used as an additive, or if sufficient Mg impurity is present, spinel ($MgAl_2O_4$) can form between grains and at triple points. (See Haroun, N. A. and Budworth, D. W., "Effects of Additions of MgO, ZnO and NiO on Grain Growth in Dense Alumina" *Transactions of the British Ceramic Society*, 69 (1970) 73–79.) This is especially so when the amount of Mg in the alumina exceeds the solubility limit at the sintering temperature. Coble, R. L., U.S. Pat. No. 3,026,210 discloses a composition and method of preparation of transparent alumina, wherein the alumina is doped with up to 0.5 weight percent magnesia present primarily as an alumina-magnesia spinel.

The majority of commercially available aluminas are deliberately sintered via a liquid phase route through the use of additives such as oxides of silicon, calcium, sodium and potassium, often added in the form of minerals or clays. These additives enhance formation of silicate liquid phases, and the presence of these liquid phases during sintering aid densification at relatively low firing temperatures. They also form glassy (silaceous) grain boundary films on cooling which are readily attacked by aqueous HF acid. This attack of grain boundary films results in a rapid in-service disintegration of liquid phase sintered polycrystalline alumina components.

Even when liquid-forming additives are not used, sufficient impurities are generally present in the starting alumina powder to result in trace liquid formation upon sintering. Typical impurities include $SiO_2$, CaO, $Fe_2O_3$, $TiO_2$, $K_2O$ and MgO.

Additionally, Genthe, W. et al., "Influence of Chemical Composition on Corrosion of Alumina in Acids and Caustic Solutions", *J. Eur. Ceramic Society* 9 (1992) 417–425, specifically addresses the corrosion resistance of alumina doped with MgO and concludes that alumina samples doped with less than approximately 11,500 ppm $Mg^{2+}$ to $Al^{3+}$ ions, do not demonstrate any appreciable resistance to HF.

Improved materials of construction which can withstand acid, especially hydrofluoric acid (HF), exposure are needed in industry. The choice of materials for HF environments is limited as HF (especially aqueous HF) is corrosive to most metallic and many non-metallic materials. This narrows the choice of materials of construction for articles such as reaction vessels and handling equipment. The material choice is further limited as process temperatures increase, since corrosion is typically a reaction requiring energy to activate. Polytetrafluoroethylene (PTFE) is often used in HF-containing environments, which limits processing temperatures to about 100° C. Therefore, the extension of existing processing temperatures is an important additional factor influencing the synthesis of new materials for use in HF environments. The principal advantage offered by ceramics in these environments is the ability to increase process temperatures with attendant improvements in process efficiency.

SUMMARY OF THE INVENTION

The present invention provides HF resistant articles comprising HF contact surfaces consisting essentially of a sintered, single phase, polycrystalline, solid solution alumina ($Al_2O_3$) and magnesia (MgO) ceramic having a magnesia content no higher than the solubility limit of magnesia in alumina at the sintering temperature for said ceramic. A process is provided in accordance with this invention wherein solid surfaces are contacted with HF. The process is characterized by providing HF contact surfaces consisting essentially of sintered, single phase, polycrystalline, solid solution alumina and magnesia ceramic having a magnesia content no higher than the solubility limit of magnesia in alumina at the sintering temperature for said ceramic.

DETAILED DESCRIPTION

This invention involves HF contact surfaces of sintered, single-phase, polycrystalline alumina containing Mg. By single-phase is meant the presence of one chemical phase (excluding porosity). By polycrystalline is meant a structure composed of an assembly of crystalline grains having irregular shapes and different orientations. By HF contact surfaces, is meant any surface of an article which is contemplated for contact with or exposure to an HF containing environment. This includes inside surfaces, outside surfaces and exposed surfaces in porous articles. For example, an inside surface is the internal surface of a cylindrical containment or reaction vessel where the HF containing environment contacts the inside surface of the vessel. An example of an outside surface is an external surface of a heat exchanger tube where an HF containing environment contacts the inside surface of the tube. In a porous article, all surfaces exposed to the environment would be in contact with the HF containing environment.

This invention employs a sintered single phase alumina material which is fabricated to avoid the formation of siliceous grain boundary and spinel phases. Spinel and silica phases have been found by the applicants to readily dissolve in HF and detrimentally affect the corrosion resistance of sintered aluminas containing those phases. Single crystal alumina (sapphire) has demonstrated excellent corrosion resistance in aqueous HF, but the commercial use of sapphire is not considered feasible due to its limited formability and its prohibitive cost. To achieve a single phase polycrystalline alumina which approaches the corrosion resistance of sapphire in aqueous HF, MgO is added as a sintering aid in accordance with this invention because other liquid phase sintering aids typically result in residual grain boundary phases that are readily attacked by HF and inhibit corrosion resistance. The addition of MgO acts as a solid-solution sintering aid which promotes densification, controls (retards) grain growth and has been suggested to redistribute silica impurities (see Bennison, et al., "A History of the Role of MgO in the Sintering of $\alpha$-$Al_2O_3$", *Ceramic Transactions*, 7 (1990) 13–49). Based on the present findings, it is contemplated that since single-phase, polycrystalline alumina approaches the corrosion resistant behavior of single crystal sapphire, other materials fabricated as single-phase and polycrystalline would also be resistant in fluorine active environments, as long as the single crystal form possessed intrinsic resistance.

To minimize the formation of spinel, the solubility limit of MgO in $Al_2O_3$ should not be exceeded. Therefore the upper limit of $\mu$moles of $Mg^{2+}$ per mole of $Al^{3+}$ for the composition of the present invention depends on this solubility limit. The solubility limit will vary depending on many factors, most important of which is the sintering temperature (see Coble, R. L. and Roy, S. K., "Solubilities of Magnesia, Titania and Magnesium Titanate in Aluminum Oxide" *Journal of the American Ceramic Society*, 5[1] (1968) 1–6). The solubility limit is also affected by the impurity level in the starting alumina as well as the sintering atmosphere. Additionally, a reducing sintering atmosphere increases the solubility of Mg in alumina and an oxidizing atmosphere decreases the solubility. When the solubility limit is exceeded, spinel is readily formed during sintering.

Normally, the contemplated sintering temperature will range from about 1450° C. to about 1950° C. Generally in this range, the solubility limit of $Mg^{2+}$ will vary from about 60 to about 3300 $\mu$moles of $Mg^{2+}$ per mole of $Al^{3+}$, as approximated by the following formula for magnesia solubility under vacuum (see R. L. Coble et al., referenced above):

$$\ln X = [8.1 - (30,706/T)]$$

where X is the atomic fraction Mg/Al, and T is the absolute temperature.

The sintering temperature is preferably no more than about 1450° C. for porous bodies, but is usually above about 1550° C. (approximately 160 $\mu$moles of $Mg^{2+}$ per mole of $Al^{3+}$) for dense materials. The sintering temperature should not exceed 2050° C. which is the melting point of alumina. This corresponds to an upper limit of about 6000 $\mu$moles of $Mg^{2+}$ per mole of $Al^{3+}$. Preferably, the magnesia content corresponds to at least about 10 $\mu$moles of $Mg^{2+}$ per mole of $Al^{3+}$. The preferred concentration level of magnesia for a given sintering temperature is the concentration at the solubility limit.

In the process of making articles of the proposed invention, use of a high purity starting alumina and semi-clean processing are key to avoiding formation of silicate based liquid phases. The higher the purity of the starting alumina, the less impurities present and therefore the lesser the amount of MgO needed to avoid formation of the liquid phases. Less pure alumina requires more MgO to achieve the demonstrated acid resistance, but only to the point the solubility limit is not exceeded. Generally the starting alumina should be at least 99.900% pure and this purity level must be maintained during processing. Sumitomo AKP-30, available from Sumitomo Chemical America, New York, N.Y., (which was indicated to be 99.995% pure) having a 0.5 $\mu$m crystallite size and 50% of agglomerates below 1 $\mu$m, was found to be a suitable starting alumina. The powder is derived from an alkoxide route and although the metal ion impurities are on the order of 10 ppm, the powder contains carbon residue of the order of 100 ppm.

Additionally, in the process for preparing the alumina and magnesia-precursor powder for making articles of the invention, all processing should be carried out in the cleanest conditions possible to avoid contamination of the powder and green body (material prior to sintering). Glassware and metalware should be avoided in the preparation and a clean hood should be used to minimize contamination by airborne-silica-containing dust. The preparation process preferably employs Teflon ® beakers, stirrers and spatulas. If green processing aids such as binders or surfactants are employed, they should be of the clean-burning variety, leaving essentially no residue on heat treatment.

The preferred method to prepare a suitable alumina and magnesia-precursor powder for use in fabricating articles of the proposed invention, can be accomplished using the steps of (1) preparing a solution of Mg-containing precursor in a solvent in which Mg-containing precursor is soluble; (2) preparing a slurry of high-purity alumina in the same solvent used in step (1), the alumina being at least 99.900% pure, preferably at least 99.995% pure; (3) mixing the appropriate amounts of solutions (2) and (3) to achieve the desired ratio of $Mg^{2+}$ to $Al^{3+}$ ions; and, (4) heating the mixture until it is dry. In preparing the solution of step (1), any solvent for which Mg is soluble can be used. Such solvents include methanol, water or ethanol. The solvent should be of the highest purity available to again minimize contamination which could detrimentally affect the performance of the resulting product. The precursor can be a magnesium nitrate, acetate or stearate (as discussed in Cohen, A. et al., "Effect of MgO Dopant and Dispersant Method on Density and Microstructure of Alumina Ceramics", *Advances in Ceramics: Structure and Properties of MgO in $Al_2O_3$ Ceramics*, 10 (1984) 780–790) or any other form that will decompose to MgO upon sintering.

In making articles of the proposed invention, the alumina and magnesia-precursor powder can be compacted by any compacting process yielding green densities of at least about 40%, preferably on the order of 55% or greater, of theoretical. During green processing, essentially clean-burning binders should be employed in order to minimize sources of contamination to the article. Appropriate compacting methods include slip casting, tape casting, double-ended die pressing, isostatic pressing and foreseeably, injection molding if a clean-burning binder is employed. The method will vary depending on the desired article to be fabricated. Useful articles within this invention include: pipes; tubes; cylinders; disks; plates; washers; liners; reaction and containment vessels; pump components (e.g., seals, casings, impellers); valve components (e.g., balls, gates, seats, trim); contact surfaces of instrument probes (e.g., thermowells, electrochemical and electromagnetic probes); column packing; catalyst support media; porous articles (filters or permeable media for liquids and gases); and transparent windows for ultraviolet, infrared, and/or microwave applications.

By way of a non-limiting example, the alumina and magnesia-precursor powder can be compacted by first lightly single-end die pressing a compact (at, for example, about 75 MPa). The pressure should be just sufficient to fabricate a green compact that can be easily handled; and a high purity graphite die, such as Poco Graphite AXF-5Q1 grade, as well as a steel tool die are considered suitable for such compacting. The green compact is then placed in a clean rubber isostatic pressing bag, evacuated with vacuum, and iso-pressed to say, about 224 MPa. The iso-pressing removes large scale defects produced by pressure gradients during single-end die pressing.

When sintering the green article, it is preferable to surround the article with material of the same composition and purity. This prevents contamination from the furnace and minimizes the loss of MgO. Effectively surrounding an article, such as a green compact described above, can be accomplished by using a covered crucible fabricated from the same starting material, or simply burying the green compact in a bed of the starting powder from step (4) of the powder preparation procedure described above.

The sintering atmosphere can be oxidizing, reducing or inert. Preferably, the temperature is ramped at 100° C./hr to 1000° C. and held for two hours. This effectively calcines the compact, distributing and decomposing the magnesium nitrate to the oxide and also removes carbon impurities through pyrolysis and oxidation. The heat treatment is continued by ramping at 500° C./hr to the sintering temperature (say, approximately 1650° C.) with a 1 hour soak, and the furnace cooled to ambient naturally under a power-off condition. Generally, the resulting sintered article of the preparation method discussed above has high (approximately 99%) density and a grain size of about 5 to 10 $\mu$m.

Most importantly, the resulting article of this invention is essentially devoid of spinel and second phases as demonstrated by its corrosion resistance.

Regarding commercial utility, the tolerable limit on corrosion for use in metallic vessels would be approximately 25 mils of metal/year, equivalent to approximately 635 $\mu$m of metal/year. More stringent corrosion requirements are needed for applications such as gears or valves, and thus could demand a tolerable limit lower than 25 mils/year.

The articles of this invention are useful in various processes in which HF contact is required. Such processes include processes involving a halogenation or dehalogenation reaction where HF is used as a reactant or is produced as a byproduct. Of note are fluorinations where halogenated hydrocarbons (typically halogenated hydrocarbons containing chlorine and/or bromine) are reacted with HF, and chlorofluorinations where halogenated hydrocarbons are reacted with chlorine and HF. U.S. Pat. No. 5,051,537 provides an example of a fluorination process where a saturated halogenated hydrocarbon containing chlorine (i.e., 1,1,1-trifluorochloroethane) is reacted with HF to form a saturated fluorinated hydrocarbon (i.e., 1,1,1,2-tetrafluoroethane). U.S. Pat. No. 4,766,260 provides an example of a fluorination process where an unsaturated halogenated hydrocarbon containing chlorine (e.g., tetrachloroethylene) is reacted with HF to form saturated halogenated hydrocarbons containing fluorine (e.g., 1,1,1,2-tetrafluorochloroethane and 1,1,1-trifluorodichloroethane). U.S. Pat. No. 5,015,791 provides an example of a liquid phase process wherein unsaturated starting materials (alkenes) are reacted with HF to produce fluorinated products. Also of note are dehalogenation processes for the production of vinyl-fluoride along with HF byproduct; and processes involving a reaction where HF is a reactant for producing a fluoroaromatic product (e.g., fluorobenzene and meta-difluorobenzene). The articles of this invention are also useful for processes where halogenated hydrocarbons containing fluorine are reacted with hydrogen in the presence of HF. U.S. Pat. No. 5,136,113 discloses an example of catalytic hydrogenolysis of fluorohalocarbons (e.g., 2,2-dichloro-1,1,1,2-tetrafluoroethane) and fluorohalohydrocarbons (e.g., 2-chloro-1,1,1,2-tetrafluoroethane) to produce less halogenated products (e.g., 1,1,1,2-tetrafluoroethane) including some products containing fewer fluorine substituents (e.g., 1,1,1-trifluoroethane). The articles of this invention are also useful for processes involving HF production, storage and/or shipping.

Typically, in these processes, surfaces are contacted with HF at a temperature between about 0° C. and 700° C. Often temperatures are between 0° C. and 200° C., particularly for liquid-phase reactions. Nevertheless, the ceramic surfaces of this invention may be used advantageously at relatively high temperatures (e.g., a temperature between about 350° C. and 700° C.).

The present invention can be further understood by reference to following non-limiting examples, wherein all temperatures are expressed in degrees Celsius (°C.), corrosion is expressed as $\mu$m/yr and mils/yr, and the amount of MgO present in a given sample is expressed in molar ppm, that is, as $\mu$moles of $Mg^{2+}$ per mole of $Al^{3+}$.

EXAMPLE 1

A compact was prepared in the following manner:

(1) Approximately 125 g of Sumitomo AKP-30 (0.5 $\mu$m), available from Sumitomo Chemical America, New York, N.Y., $Al_2O_3$ was weighed and placed in a Teflon beaker with a graphite bottom for hotplate use.

(2) Approximately 0.4 g of $Mg(NO_3)_2 \cdot 6H_2O$ was added to high-purity methanol and stirred until dissolved into solution.

(3) The $Mg(NO_3)_2 \cdot 6H_2O$/methanol solution was then added to the $Al_2O_3$.

(4) This mixture was heated to 40° C. and stirred with a high-density polyethylene (HDPE) stirrer until the slurry thickened.

(5) The stirrer was removed and the remaining solvent was allowed to evaporate off. A perforated plexiglass cover was used over the container to prevent contaminants from entering solution.

(6) When dry, the powder was crushed using a jar rolled over the sample which was contained within a plastic bag.

(7) The powder was pressed into pellets using 6500 psi (44.8 MPa) pressure. These pellets were placed on a bed of unpressed sample powder, covered with additional sample powder and placed in a covered container.

(8) The assembly was then placed into a furnace and sintered in air to 1650° C. as follows: 2° C./min up to 1000° C. and held at 1000° C. for 2 hours; 8° C./min to 1650° C. and held at 1650° C. for 1 hour; then cooled. The resulting pellet was flat, tan in color, having no large cracks.

(9) Corrosion testing was accomplished by first weighing the sample and then placing it into a 37% HF solution heated to 90° C. The sample was weighed at the 1 week and 2 week interval.

Corrosion results are tabulated in Table I.

COMPARATIVE EXAMPLES A THROUGH D DRY PRESSED VENDOR SUPPLIED MATERIALS

Samples were prepared by dry pressing at 6500 psi (44.8 MPa) the powders as received from the vendors (listed below) without the addition of processing aids such as surfactants or binders. The powders were pressed into approximately 0.5 inch (1.27 cm) diameter and approximately 0.375 inch (0.95 cm) thick pellets.

EXAMPLE A

Sumitomo AkP-30 was obtained from Sumitomo Chemical America, New York, N.Y.

EXAMPLE B

Alcoa A16 was obtained from Alcoa Industrial Chemicals, Box 300, Bauxite, Arz. 72011.

EXAMPLES C AND D

Showa A145-1 and A145-H was obtained from Showa Denko, Alumina Division; 10-12, Shiba Koen 2-chome; Minato-Ku, Tokyo, 105, Japan.

The materials of Comparative Examples A through D were subjected to corrosion testing in the manner described above for Example 1. Results are shown in Table I.

COMPARATIVE EXAMPLES E THROUGH L VENDOR SUPPLIED

These samples were tested for corrosion as described in Example 1 as is, that is, in sintered compact form supplied by the vendor. Results are shown in Table I.

EXAMPLES E THROUGH G AND J

Coors AD 99.9, AD 99.5, AD 94.0 and Optical Grade Spinel were obtained from Coors Ceramic Company, Structural Division, 600 9th Street, Golden, Colo. 80401.

EXAMPLE H

Cercom 99.99 Al$_2$O$_3$ was obtained from Cercom Inc., 60 Watson Way, Vista, Calif. 92083.

EXAMPLE I

Sapphire was obtained from Saphikon, 33 Powders Street, Milford, N.H. 03055.

EXAMPLES K AND L

Haynes Alloy No. 242 (65% Ni, 25% Mo, 1% Fe, 1% Co and 8% Cr) and Hastalloy B2 (69% Ni, 26% Mo, 3% Fe, 1% Co, 1% Cr) were obtained from Haynes International, Inc., 1020 West Park Ave., P.O. Box 9013, Kokomo, Ind. 46902-9013.

TABLE I

EXPERIMENTAL CORROSION DATA
(Aqueous HF, 90° C.)

| Ex | Composition | Prep. Method | Sintering Temp °C. | μm/ year | mils/ year |
|----|-------------|--------------|--------------------|----------|------------|
| 1 | Al$_2$O$_3$ Sumitomo/500 ppm MgO | Solution/Dry Press | 1650 | 53 | 2.1 |
| A | Sumitomo AkP-30 | Dry Press | 1700 | 3822.2 | 150.5 |
| B | Alcoa A16 | Dry Press | 1550 | Consumed | |
| C | Showa A145-1 (1.8 μm) | Dry Press | 1700 | 55335.1 | 2178.5 |
| D | Showa A145-H (3.0 μm) | Dry Press | 1700 | 2494.9 | 98.2 |
| E | Coors AD 99.9 (Nom. 99.9% Al$_2$O$_3$) | Vendor | N/A | Consumed | |
| F | Coors AD 99.5 (Nom. 99.5% Al$_2$O$_3$) | Vendor | N/A | Consumed | |
| G | Coors AD 94.0 (Nom. 94.0% Al$_2$O$_3$) | Vendor | N/A | Consumed | |
| H | Cercom 99.99 Al$_2$O$_3$ | Vendor | N/A | 7826.5 | 308.1 |
| I | Saphikon Sapphire | Vendor | N/A | 6.7 | 0.3 |
| J | Coors Optical Grade Spinel (MgAl$_2$O$_4$) | Vendor | N/A | 1897.5 | 74.7 |
| K | Haynes Alloy No. 242 | Vendor | N/A | 4115.0 | 162.0 |
| L | Hastalloy B2 | Vendor | N/A | 13259.0 | 522.0 |

The corrosion information in Table I was calculated from weight loss data taken after two weeks of exposure and is given as the corrosion rate, D, in mils/yr and μm/yr. The corrosion rate, D, is determined by:

$$D = \frac{\Delta W}{\rho S_a t}$$

where $\Delta W = W_o - W_i$ ($W_o$ is the initial sample weight and $W_i$ is the instantaneous sample weight), $\rho$ is material density, $S_a$ is surface area and t is time. D can also be viewed as the rate of material thinning or the rate at which the material is being corroded away at its exposed surface. D is also used to predict material life.

Corrosion resistance in aqueous HF was tested in the following manner. Samples were weighed before and after exposure to the corrosive environment. The corrosion conditions consisted of a 38.26% HF/61.74% water (48% reagent grade aqueous HF diluted to 38%) solution at a temperature of 90° C. and atmospheric pressure. Samples were exposed to these conditions for a total of two weeks. Sample dimensions to determine surface areas were also measured prior to exposure.

What is claimed is:

1. A process wherein HF and a solid HF contact surface are employed comprising:
   (1) employing a solid HF contact surface consisting essentially of a sintered, single phase, polycrystalline, solid-solution alumina and magnesia ceramic wherein magnesia is present in an effective amount, at least about 10 μmoles $Mg^{+2}$ per mole $Al^{+3}$ and no higher than the solubility limit of magnesia in alumina at the sintering temperature for said ceramic, to provide resistance to corrosion of said HF contact surface from HF; and
   (2) contacting the HF contact surface of (1) with HF.

2. The process of claim 1 wherein said solid HF contact surface is contacted with HF at a temperature between about 0° C. and 700° C.

3. The process of claim 1 wherein the solid surface is the surface of a porous article.

4. The process of claim 1 wherein the solid surface is the surface of a transparent window for ultraviolet, infrared or microwave applications.

5. The process of claim 1 wherein the solid HF contact surface is the surface of an article selected from the group consisting of pipes, disks, washers, reaction vessels, containment vessels, pump components, valve components, instrument probes and catalyst support media.

6. The process of claim 1 wherein said ceramic contains between about 60 and 3300 μmoles $Mg^{2+}$ per mole $Al^{3+}$.

7. The process of claim 1 wherein the said surface is the surface of an article selected from the group consisting of liners and column packing.

8. The process of claim 1 wherein said HF contact surface is the surface of an article selected from the group consisting of cylinders and plates.

9. A process wherein HF is a reactant or a product of a halogenation or dehalogenation reaction and said HF is contacted with a solid HF contact surface of an article employed for said halogenation or dehalogenation, comprising:
   (1) employing a solid HF contact surface consisting essentially of a sintered, single phase, polycrystalline, solid solution alumina and magnesia ceramic wherein magnesia is present in an effective amount, at least about 10 μmoles $Mg^{+2}$ per mole $Al^{+3}$ and no higher than the solubility limit of magnesia in alumina at the sintering temperature for said ceramic, to provide resistance to corrosion of said HF contact surface from HF; and
   (2) contacting the HF contact surface of (1) with HF.

10. A process wherein HF is a reactant for producing a fluoroaromatic product and said HF is contacted with a solid HF contact surface of an article employed for said fluoroaromatic product production, comprising:
    (1) employing a solid HF contact surface consisting essentially of a sintered, single phase, polycrystalline, solid solution alumina and magnesia ceramic wherein magnesia is present in an effective amount, at least about 10 μmoles $Mg^{+2}$ per mole $Al^{+3}$ and no higher than the solubility limit of magnesia in alumina at the sintering temperature for said ceramic, to provide resistance to corrosion of said HF contact surface from HF; and
    (2) contacting the HF contact surface of (1) with HF.

11. A process wherein HF is produced and said HF is contacted with a solid HF contact surface of an article employed for said HF production, comprising:
    (1) employing a solid HF contact surface consisting essentially of a sintered, single phase, polycrystalline, solid solution alumina and magnesia ceramic wherein magnesia is present in an effective amount, at least about 10 μmoles $Mg^{+2}$ per mole $Al^{+3}$ and no higher than the solubility limit of magnesia in alumina at the sintering temperature for said ceramic, to provide resistance to corrosion of said HF contact surface from HF; and
    (2) contacting the HF contact surface of (1) with HF.

12. A process wherein HF is stored and said HF is contacted with a solid HF contact surface of an article employed for said HF storage, comprising:
    (1) employing a solid HF contact surface consisting essentially of a sintered, single phase, polycrystalline, solid solution alumina and magnesia ceramic wherein magnesia is present in an effective amount, at least about 10 μmoles $Mg^{+2}$ per mole $Al^{+3}$ and no higher than the solubility limit of magnesia in alumina at the sintering temperature for said ceramic, to provide resistance to corrosion of said HF contact surface from HF; and
    (2) contacting the HF contact surface of (1) with HF.

13. A process wherein HF is shipped and said HF is contacted with a solid HF contact surface of an article employed for said HF shipment, comprising:
    (1) employing a solid HF contact surface consisting essentially of a sintered, single phase, polycrystalline, solid solution alumina and magnesia ceramic wherein magnesia is present in an effective amount, at least about 10 μmoles $Mg^{+2}$ per mole $Al^{+3}$ and no higher than the solubility limit of magnesia in alumina at the sintering temperature for said ceramic, to provide resistance to corrosion of said HF contact surface from HF; and
    (2) contacting the HF contact surface of (1) with HF.

* * * * *